United States Patent
Yamamoto et al.

(10) Patent No.: US 6,237,967 B1
(45) Date of Patent: May 29, 2001

(54) THREADED CONNECTION FOR OIL COUNTRY TUBULAR GOODS AND ITS METHOD OF MANUFACTURING

(75) Inventors: Miyuki Yamamoto, Izumiohtsu; Masaaki Sugino, Amagasaki, both of (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 09/325,357

(22) Filed: Jun. 4, 1999

Related U.S. Application Data

(63) Continuation of application No. PCT/JP97/03645, filed on Oct. 8, 1997.

(51) Int. Cl.[7] .................................................. F16L 15/04
(52) U.S. Cl. ......................................... 285/333; 285/390
(58) Field of Search .................................... 285/333, 334, 285/355, 390

(56) References Cited

U.S. PATENT DOCUMENTS

| | | | |
|---|---|---|---|
| 2,239,942 | * 4/1941 | Stone et al. | 285/334 |
| 3,870,351 | * 3/1975 | Matsuki | 285/334 |
| 4,611,838 | * 9/1986 | Heilmann et al. | 285/334 |
| 4,623,173 | * 11/1986 | Handa et al. | 285/333 |
| 4,736,967 | * 4/1988 | Mott et al. | 285/333 |
| 4,770,444 | * 9/1988 | Hauk | 285/333 |
| 4,958,862 | * 9/1990 | Cappelli et al. | 285/334 |
| 4,984,829 | * 1/1991 | Saigo et al. | 285/334 |
| 5,137,310 | * 8/1992 | Noel et al. | 285/333 |
| 5,423,579 | * 6/1995 | Blose et al. | 285/334 |

FOREIGN PATENT DOCUMENTS

| | | | |
|---|---|---|---|
| 2116276 | * 9/1983 | (GB) | 285/334 |
| 60-26878 | 2/1985 | (JP) . | |
| 6-281059 | 10/1994 | (JP) . | |
| 6-281061 | 10/1994 | (JP) . | |

* cited by examiner

Primary Examiner—Eric K. Nicholson
(74) Attorney, Agent, or Firm—Burns, Doane, Swecker & Mathis, LLP

(57) ABSTRACT

[Purpose]

To provide a threaded connection capable of preventing deterioration of gas tightness from occurring when a tensile stress acts thereon after a compressive force in the direction of the axis of a pipe is applied.

[Means of Solving Problems]

(1) A threaded connection for oil country tubular goods wherein a length (15) of a thick walled portion with a diameter defined in the formula (1), is longer than the length (16) from seal contact to the extremist of the pin section, shorter than a half of the length (17) of the pin section, the rest of inside diameter is equal to the inside diameter of pipe proper, having smooth tapered inner wall between thick walled portion and pipe proper. The inside diameter of the box section of torque shoulder section is the same as inside diameter of thick wall.

$$d0 > dx \geq d0 - 6 \text{ mm} \qquad (1)$$

Where dx(mm)=inside diameter of the thick walled portion of the pin section, and d0(mm)=inside diameter of the pipe proper.

8 Claims, 4 Drawing Sheets

|  | THREADED CONNECTION (MARKING) | DIMENSIONS OF A PIPE PROPER | | | DIFF IN THE INSIDE DIAMETER OF THE PIN SECTION AT ITS EXTREMITY (mm) | LEAKAGE LOAD (%) |
|---|---|---|---|---|---|---|
|  |  | OUTSIDE DIAMETER (mm) | WALL THICKNESS (mm) | WALL THICKNESS/ OUTSIDE DIA. (WALL THICKNESS RATIO) |  |  |
| EMBODIMENTS OF INVENTION | A | 88.9 | 6.40 | 0.072 | −6.0 | >100 |
|  | B | 177.8 | 10.36 | 0.058 | −0.05 | >100 |
|  | C | 241.3 | 11.99 | 0.050 | −2.0 | >100 |
|  | D | 273.1 | 12.57 | 0.046 | −4.0 | >100 |
|  | E | 339.7 | 13.06 | 0.038 | −6.0 | >100 |
| EXAMPLES FOR COMPARISON | a | 88.9 | 6.40 | 0.072 | +5.0* | 90 |
|  | b | 177.8 | 10.36 | 0.058 | +5.0* | 85 |
|  | c | 241.3 | 11.99 | 0.050 | +4.0* | 60 |
|  | d | 273.1 | 12.57 | 0.046 | +2.0* | 75 |
|  | e | 339.7 | 13.06 | 0.038 | +3.0* | 65 |

NOTE: 1. "DIFFERENCE IN THE INSIDE DIAMETER OF THE PIN SECTION AT ITS EXTREMITY" INDICATES VALUES REPRESENTING THE PREDETERMINED INSIDE DIAMETER OF THE PORTION OF THE PIN SECTION AT THE EXTREMITY THEREOF WHERE THE INSIDE DIAMETER REMAINS UNCHANGED MINUS THE INSIDE DIAMETER OF THE PIPE PROPER.
2. VALUES MARKED BY * INDICATE VALUES OUTSIDE THE SCOPE OF THE INVENTION.

FIG.4

| CHEMICAL COMPOSITION (wt%) : BALANCE : Fe | | | | | | MECHANICAL PROPERTY | |
|---|---|---|---|---|---|---|---|
| C | Si | Mn | P | S | Cr | YS (MPa) | TS (MPa) |
| 0.2 | 0.6 | 0.6 | 0.015 | 0.008 | 18.0 | 580 | 800 |

THREADED CONNECTION FOR OIL COUNTRY TUBULAR GOODS AND ITS METHOD OF MANUFACTURING

This application is a continuation of PCT International Application No. PCT/JP97/03645, filed on Oct. 8, 1997, and which designated the United States of America.

DETAILED DESCRIPTION OF THE INVENTION

1. Field of the Invention

The present invention relates to a threaded connection for oil country tubular goods and its method of manufacturing, used in exploration and production of natural gas or crude oil, and particularly, to a threaded connection for oil country tubular goods, suitable for use at very deep oil wells, and the like, in highly corrosive environments.

2. Related Art

Threaded connections are in widespread use today as a technical means of connecting oil country tubular goods used in exploration for and production in natural gas fields and oil fields at depths of several thousands meters. There are two types of the threaded connections. One is an integral type wherein a pipe is provided with a pin section at one end and a box section at the other end, the pin section of the pipe being connected with the box section of another pipe. The other is a coupling type wherein two pipes, each provided with a pin section at opposite ends, are connected via a coupling provided with a box section at opposite ends. Performances required of these threaded connections include; 1) capability to withstand axial tensile force caused by the weights of connected pipes themselves, 2) capability to withstand an internal pressure caused by an internal fluid flowing inside of the pipes, and 3) corrosion resistance against the internal fluid. The performances mentioned above are more strictly required lately because of recent trends of an increasing number of oil wells being worked in harsh environments containing corrosive components such as hydrogen sulfide, and the like.

As a result of increase of depth of oil wells, the diameter of each oil well has become major factor of the cost of drilling, and the requirement for reduction in the diameter of oil well has led to requirements for the smaller outer diameter of a threaded connection, which in turn, has resulted in requirements for reduction in the wall thickness of the box section.

In order to cope with such requirement, many proposals relating to a threaded connection, which provide with a seal section and a torque shoulder section, have been made. An integral type threaded connection disclosed, as a typical example, in Japanese Patent Laid-Open No. Sho 60-26878 is described hereafter.

FIG. 8 shows a cross sectional view of an integral type threaded connection "along a plane of the axis of a pipe". The above connection provides with grooves on the internal surface of both a pin section and a box section thereof to prevent turbulence in flow of an internal fluid so that corrosion resistance is enhanced (hereafter the term "along a plane of the axis of a pipe" is omitted). A seal forming threadless section 13 provided on the external surface of the pin section 11 which includes a thread section 12 and a seal forming threadless section 23 provided on the surface of the box section 21 on the farther inner side thereof than a female thread section 22 provided on the surface of the box section are brought into contact with each other, forming a seal section. The above seal section ensures gas tightness against an internal pressure caused by the internal fluid.

In general threaded connections including the threaded connection shown in FIG. 8 are provided with a make-up force reinforcement mechanism, called "interference", whereby the pitch diameter of the male thread section of the pin section is rendered larger than that of the female thread section of the box section.

Hereinafter, in this specification, the term "a pipe" means to include "the pin section at the extremity of the pipe and, in the case of the integral type, the box section as well". The term "a pipe proper" means to include "neither the pin section nor the box section".

When a torque shoulder forming a threadless face 14 disposed at the extremity of the pin section 11 is butted against a torque shoulder forming a threadless face 24 disposed in the innermost part of the surface of the box section 21, a torque shoulder is formed. The torque shoulder is provided so as to control a torque for making up the threaded connection such that an appropriate pressure is developed at a contact face of the seal section.

In FIG. 8, a smooth groove 30 is additionally provided on the internal surface of the threaded connection in close vicinity of the torque shoulder such that turbulence in flow of the fluid along the internal surface is prevented, avoiding inducement of local corrosion.

However, the threaded connection constituted as above has problems described hereafter.

Occasionally oil country tubular goods are subjected to a compressive force in the axial direction and bending load, although not so frequently. In the event that the threaded connection is loaded thereafter with a tensile force due to pipes' own weight, the contact pressure degreases at the seal section and at the torque shoulder, and in an extreme case, openings are formed. As a result, there arise such problems as leakage of the internal fluid due to deterioration in gas tightness against the internal pressure and initiation of intense local corrosion due to turbulence in flow of the internal fluid caused by the openings formed as above.

When a twisting torque acts on the threaded connection in a loosening direction for any reason in a state when the contact pressure is lowered or openings are present, the threaded connection will be at a risk of being disconnected, and the pipes drop down into an oil well. Since it is very difficult to connect again the pipes in a oil well, the worst case may occur to abandon the oil well still under development or already in production. There is an increasing tendency of such incidents to occur because of an increase in tensile stress due to the pipe's own weight according as the depth of oil wells increases.

The objective of the invention is to provide a threaded connection capable of preventing from the contact pressure decrease and formation of openings at the seal section and/or at the torque shoulder when a tensile stress is imposed on the threaded connection after a compressive force in the axial direction or bending load is applied thereto, and to ensure corrosion resistance as well.

SUMMARY OF THE INVENTION

FIG. 1 is a sectional view showing an embodiment of a coupling type threaded connection according to the invention. In this type of the threaded connection, the pin section 11 provided at each end of a pipe 10 is connected to the pin section 11 provided at another end of pipe 10 via a coupling 20 provided with the box section 21 at both ends thereof.

FIG. 2 is an expanded sectional view of a part (part A in FIG. 1) in the vicinity of the extremity of the pin section of the typical threaded connection according to the invention. In FIG. 2, a seal forming threadless face 13 and a torque shoulder forming threadless face 14 of the pin section 11 are disposed to a seal forming threadless face 23 and a torque shoulder forming threadless face 24 of the box section 21 and they are brought into contact with and butted each other forming a metal-to-metal seal and a torque shoulder similarly to the case of the threaded connection shown in FIG. 8. In FIG. 2, a portion of the internal surface of the pin section, having inside diameter of dx1 extends from the extremity of the pin section toward the vicinity of the end of the pipe proper beyond the seal forming section corresponding length. Normally, a thick walled portion has a constant wall thickness as shown in FIG. 2. However, a thick walled portion may have a varying wall thickness rather than a constant wall thickness. For example, a portion having the varying diameter of dx2 shown in FIG. 2 where the diameter gradually increases up to the inside diameter of the pipe proper, may overlap to the length of the seal section. In such a case, the length from the extremity of the pin section to the position where the inside diameter becomes equal to that of the pipe proper (that is, the length of the thick walled portion of the pin section) must be equal or shorter than a half of the entire length of the pin section. That is, in FIG. 2, an axial length of the portion having the inside diameter of dx1 (the potion of a constant inside diameter) plus the length of the portion having the varying inside diameter of dx2 (the portion where the inside diameter gradually increases up to that of the pipe proper) must be a half or less of the length of the pin section 11.

FIG. 3 is a sectional view of an integral type threaded connection according to the invention. A pin section 11 thereof is in the shape similar to a corresponding part shown in FIG. 1.

The present invention has been accomplished taking into account the requirements mentioned above, and relates essentially to a threaded connection for oil country tubular goods described hereafter (reference: FIGS. 1~3).

(1) A threaded connection for oil country tubular goods wherein a metal-to-metal seal and a torque shoulder are formed when a seal forming threadless face 13, disposed closer to the extremity of the pin section 11 of a pipe proper than a male thread section 12 on the tapered external surface of the pin section 11, and a torque shoulder forming threadless face 14, disposed at the extremity of the pin section 11, are brought into contact with, and butted against a seal forming threadless face 23 and a torque shoulder forming threadless face 24, disposed in the innermost region on the tapered surface of the box section 21 provided with a female thread section 22 having a smaller pitch diameter smaller than that of the male thread section, opposite to aforesaid corresponding parts of the pin section respectively, by mating the female thread section with the male thread section, and characterized in that a length 15 of a thick walled portion, formed by reducing the inside diameter at the extremity of the pin section such that a condition expressed by the formula (1) given below is satisfied, is greater than a length 16 along the axis of the pipe extending from the extremity of the pin section to a position corresponding to the metal-to-metal seal, and equivalent to a half or less of a length 17 of the entire pin section from the extremity thereof, the inside diameter of the pin section gradually increasing from the side of the thick walled portion at the extremity of the pin section towards the rest of the pin section on the side of the pipe proper while the inside diameter of the box section at the torque shoulder is equal to that of the thick walled portion at the extremity of the pin section in a state of the threaded connection being made up.

$$d0 > dx \geq d0 - 6 \tag{1}$$

where dx (mm)=inside diameter of the thick walled portion at the extremity of the pin section, d0(mm)=inside diameter of the pipe proper In the formula (1) above, the box section 21 may be either a box section provided in the interior of a coupling of the coupling type threaded connection or a box section integrally joined with the pipe proper in the case of the integral type threaded connection.

Herein, "a length 16 along the axis of the pipe extending from the extremity of the pin section to a position corresponding to the metal-to-metal seal" refers to "a length of a line along the internal surface of the pin section, defined by a plane vertical to the axis of the pipe, including a position of the metal-to-metal seal formed on the external surface of the pin section in a state of the threaded connection being made up". In practice, as the metal-to-metal seal formed is planar, the length mentioned above has a spread, in which case, the length is defined by the closest edge of the spread to the extremity of the pin section.

The term of "a length equivalent to a half or less of a length of the entire pin section" refers to "a length of a line along the internal surface of the pin section, defined by a plane vertical to the axis of the pipe, passing a middle point (a halfway point) of the length 17 of the pin section".

The expression of "the inside diameter of the pin section gradually increasing from the side of the thick walled portion at the extremity of the pin section towards the rest of the pin section on the side of the pipe proper" means that the inside diameter of the pin section is gradually increased up to that of the pipe proper such that stepped parts are not formed on the internal surface of the pin section in the vicinity of a region where the inside diameter of the pin section attains an equivalent to the inside diameter of the pipe proper.

The term "the inside diameter of a pipe proper" refers to "the lower limit within manufacturing tolerance of the inside diameter of a portion of a pipe except for the pin section.

BRIEF DESCRIPTION OF THE DRAWINGS

FIG. 2 and FIG. 8 are positive.

FIG. 4 shows the specification of threaded connections and the result of the test.

FIG. 5 shows the chemical composition and mechanical properties of the pipe used in the test.

FIG. 6(*b*) is a sectional view of the threaded connections used as specimens at an internal surface corrosion test showing a comparative example having a stepped part on the internal surface thereof. The numerals 18 and 19 in FIG. 6(*a*) and in FIG. 6(*b*) are corroded wall thickness measured points of the pin section.

FIG. 8 is a sectional view of an integral type threaded connection according to the invention, wherein grooves are provided on the internal surface of the pin section and a box section to prevent turbulence in flow of an internal fluid so that corrosion resistance is enhanced. Numeral 30 is a groove provided on the internal surface.

DESCRIPTION OF PREFERRED EMBODIMENTS

Figure 1:
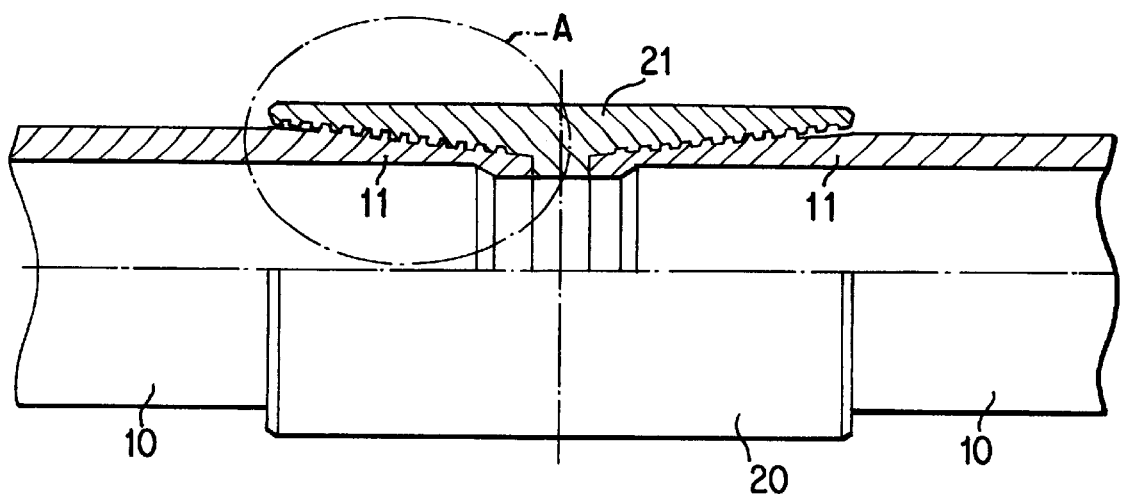
FIG. 1 is a sectional view showing a coupling type threaded connection according to an embodiment of the invention among the threaded connections according to the invention. Mark A corresponds to the expanded portion shown in FIG. 2. Numerals are; 10: pipe proper, 11: pin section, 20: coupling, 21: box section, respectively.

The inventor has conducted detailed studies on behavior of threaded connections when compressive stress or bending load acts thereon in order to find solutions to the problems described above, encountered by conventional threaded connections, and confirmed the following points:

1) Bending load causes tension on the convex side of bending, and compression on the concave side of bending. Since the problems described above occur on the concave side of bending, solution of the problems depends basically on improvement in performance of a threaded connection against a compressive force. In other words, a bending load can be coped with by a countermeasure against a compressive force.

2) Compressive force acting on a threaded connection is borne by the thread section, the seal section, and the torque shoulder. In the case of the conventional threaded connection described above wherein the grooves are provided on the internal surface in close vicinity of the torque shoulder, the wall thickness thereof in this region is relatively thin, rendering capability of the torque shoulder to bear compressive force smaller.

3) Consequently, pronounced plastic deformation occurs to the torque shoulder due to a compressive force acting thereon. Thereafter, when the threaded connection is loaded with a tensile force caused by the pipe's own weight, contact pressure at the torque shoulder decreases and/or openings are formed due to the plastic deformation described above in an extreme case. As the torque shoulder has a function of causing an appropriate contact pressure to be developed at the seal section, such deterioration in behavior of the torque shoulder results in poor performance of the seal section.

4) Plastic deformation at the torque shoulder caused by compressive force is restrained by increasing the wall thickness of the pin section in close vicinity of the torque shoulder. However, when the wall thickness is increased excessively, turbulence occurs to flow of an internal fluid, resulting in initiation of local corrosion. Hence, the internal surface must be rendered smooth in shape so as not to cause turbulence in flow of the internal fluid.

5) In case that the wall thickness of the pin section is increased as far as the root of the pin section, the rigidity of the pin section becomes excessively high due to the aforesaid make-up force reinforcement mechanism caused by the effect of "interference" between the male thread section and the female thread section, and a large tensile stress is caused to act on the external surface of the box section, rendering the external surface susceptible to stress corrosion cracking. However, in case that an increase in the wall thickness is limited to a length in a predetermined range from the extremity of the pin section, most of the compressive stress is borne by a thick-walled portion of the box section, and only a small proportion thereof acts on the external surface with the result that the stress corrosion cracking described above does not occur.

Hereafter, reasons for setting restrictive conditions on the threaded connection according to the invention are explained:

1. Inside Diameter

Within the length 15 of the thick walled portion at the extremity of the pin section, a relationship between the inside diameter dx of the pin section and the inside diameter d0 of the pipe proper is expressed by the formula (1) given below:

$$d0 > dx \geq d0 - 6 \tag{1}$$

Herein, the formula $d0 > dx \geq d0 - 6$, means that the inside diameter of the thick walled portion at the extremity of the pin section be rendered smaller by 6 mm or less in comparison with the inside diameter d0 of the pipe proper. Since a difference in the wall thickness therebetween corresponds to a difference in the radius, this means that the wall thickness of the pin section is increased by 3 mm or less. An increase in the wall thickness of the seal forming face and the torque shoulder forming face, respectively, of the pin section contributes to enhancement of capability of the respective faces to share compressive force therebetween.

In order to enjoy such effect described above, the length 15 of the thick walled portion at the extremity of the pin section is rendered not shorter than the length 16 extending from the extremity of the pin section to a position on the internal surface thereof corresponding to the seal forming face, but not longer than a half of the length 17 of the entire pin section from the extremity thereof. The length 15 is to be rendered at least equal to the length 16 extending from the extremity of the pin section to the position on the internal surface thereof corresponding to the seal forming face, because the compressive force is sufficiently reduced by increasing the wall thickness for a length at least within the aforesaid range. Increasing the wall thickness for the length 15 in a range shorter than the above, for example, only at a region where the extremity of the pin section is butted against corresponding parts of the box section, is insufficient for reducing compressive force.

The reason for setting the upper limit to the range of length of the thick walled portion at one half of the length 17 of the entire pin section is that in case of the thick walled portion being extended beyond the aforesaid range and as far as close to the root of the pin section, rigidity of the pin section becomes excessively high with the result that owing to interference by the mechanism mentioned in the foregoing, large tensile stress is caused to occur to the external surface of a thin walled portion of the box section, inducing stress corrosion cracking.

The reason for rendering the inside diameter of the pin section by 6 mm or less from the inside diameter of the pipe proper at the lower limit within manufacturing tolerance is that in a region where the inside diameter of the pin section is reduced in more than 6 mm, an internal space in the region diminishes to an extent that a flow rate of an internal fluid is affected. The thicker the wall thickness is rendered, the more effective from the viewpoint of capabilities of the respective parts to bear compressive force as described above, however, the less the internal space becomes in volume to that extent with the result that a necessary flow rate of the internal fluid can not be ensured. In order to prevent plastic deformation from occurring to the torque shoulder due to compressive force normally occurring by enhancing the capability of the pin section to bear compressive force, it is desirable to render the inside diameter of the thick walled portion at the extremity of the pin section for the length 15 smaller than that of the pipe proper. That is, the inside diameter of said portion may preferably be reduced smaller by more than 0 mm, more preferably, by the range of 0.5 to 5 mm.

2. Shape of the Internal Surface

It is important to form a smooth internal surface at the boundary between the pin section and the box section without any stepped part by equalizing the inside diameter db of the box section in close vicinity of the torque shoulder with the diameter of the pin section, at the extremity thereof The above condition is required to prevent turbulence in flow of the internal fluid.

The inside diameter dx2 of a portion of the pin section wherein the inside diameter varies is to be gradually increased such that no turbulence in flow of the internal fluid occurs on the internal surface both (1) in the vicinity of a boundary between a portion of a constant inside diameter dx1 and a portion of a varying inside diameter dx2, and (2) in the vicinity of a boundary where the inside diameter dx2 becomes equal to the inside diameter of the pipe proper. At the boundary (1) between the internal surface of the portion of the inside diameter dx1 and that of the inside diameter dx2, the angle formed by the two internal surfaces in the section along a plane of the axis of the pipe, is preferably to be within the range of 230° to 180° (i.e. flush with each other) on the internal surface side. At the boundary (2) where the inside diameter of the pin section becomes equal to that of the pipe proper, an angle formed by two internal surfaces on the same basis as above is preferably to be within the range of 150° to 180° (ie. flush with each other).

Otherwise, the internal surface at the boundary (1) and (2), respectively, may be rendered a curve of a large curvature radius, in a sectional view, in place of an angle formed by two straight lines crossing each other. It is desirable in such a case that an angle formed by crossing the extensions of two straight lines connected to the curve, but away from each other, be within the range of angles for the boundary (1) and (2) above, respectively.

Figure 2:
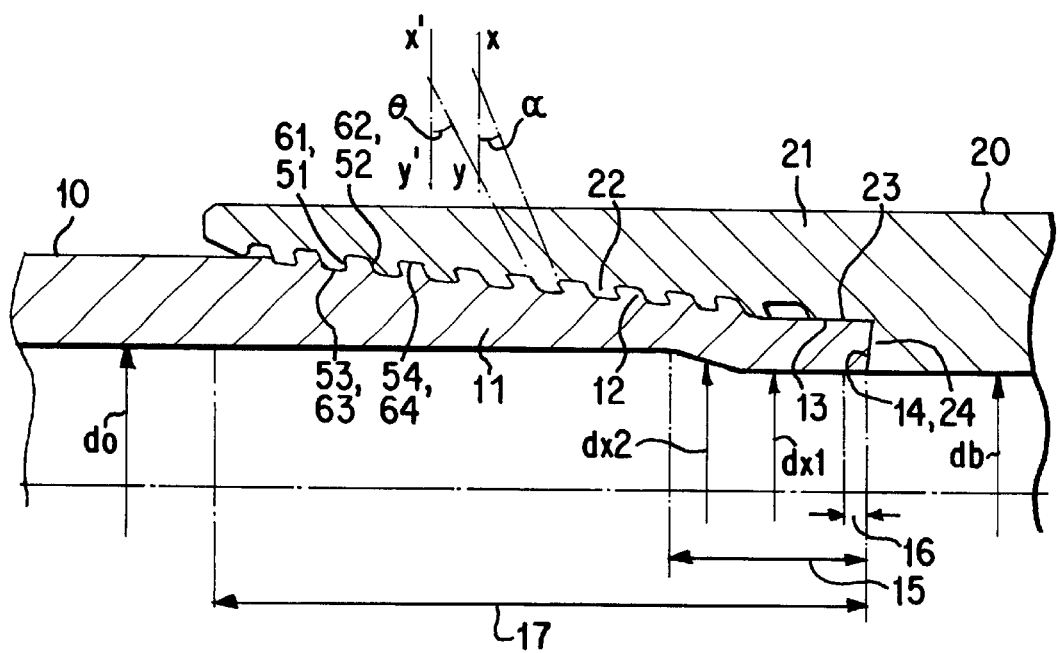
FIG. 2 is an expanded sectional view of a portion (Mark A in FIG. 1) close to the extremity of a pin section of a typical threaded connection according to the invention. The symbols are; d0(mm): inside diameter of the pipe proper, dx1: inside constant diameter of thick walled portion, dx2: inside diameter where the diameter gradually increases from the thick walled portion up to the inside diameter of the pipe proper. Numerals are; 12: male thread section, 13: seal forming threadless face, 14: torque shoulder forming threadless face, 15: a length of a thick walled portion on the internal surface of the pin section from the extremity thereof, 16: the length extending from the extremity of the pin section to the position on the internal surface thereof corresponding to the seal forming face, 17: length of the pin section, 22: female thread section, 23: seal forming threadless face of the box section, 24: torque shoulder forming threadless face of the box section, respectively. Numerals are; 51: load surface of a male thread, 61: load surface of a female thread, (a male thread, a female thread in the order without description hereafter) 52 and 62: inserting surface, 53 and 63: bottom surface, 54 and 64: top surface. The load surface of a male thread and a female thread 51, 61 contact together, however, the inserting surface 52, 62, the bottom surface 53, 63 and the top surface 53, 63 don't necessarily contact each other. Symbols are; α: flank angle of the load surface, θ: flank angle of the inserting surface. The α is an angle between the line of X–Y vertical to the pipe axis and the line of load surface on the cross section along the pipe axis. Angle α is positive when measured clockise, therefore, the α shown in FIG. 2 is negative and the α shown in FIG. 8 is positive. On the other hand, angle θ is positive when measured counter clockwise, therefore, the θs shown in both

An internal surface formed by the varying inside diameter dx2 may be rendered a smooth curve along a plane including the axis of the pipe, in place of a straight line as shown in FIG. 2, representing the diameter of the thick walled portion, gradually increasing towards the diameter of the pipe proper. Even in that case, the length of the portion of reduced diameter is to be one half or less of the length of the pin section from the extremity thereof.

It is necessary to render the internal surfaces of the pin section and the box section smoothed out in section because local corrosion can be kept under control by preventing occurrence of turbulence in flow of the internal fluid in an attempt to cope with a recent trend of an increasing number of oil wells which are subjected to worsening environments with corrosive components such as hydrogen sulfide, and the like.

Figure 3:
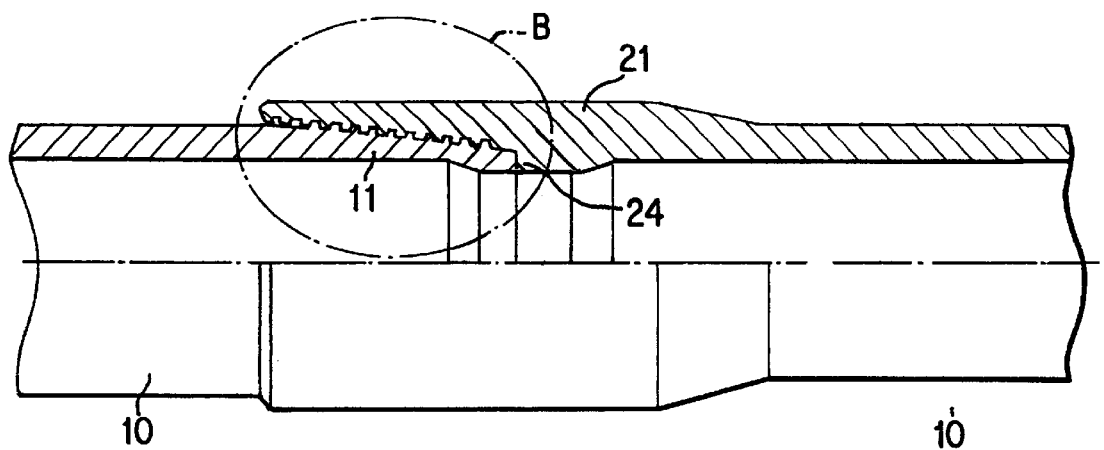
FIG. 3 is a sectional view of an integral type threaded connection according to the invention. Mark B corresponds to the expanded portion shown in FIG. 2 same as the mark A in FIG. 1.

Description stated above is applicable in its entirety to a integral type threaded connection. The shape of the pin section 11 in FIG. 3 is the same as one shown in FIG. 1. The internal surface of the box section, in close vicinity of the torque shoulder, is substantially flush with that of the pin section, forming a smooth continuous internal surface. That is, the inside diameter of the box section in close vicinity of the torque shoulder of the integral type threaded connection must be rendered smaller than the inside diameter of the pipe proper to which the box section is connected by a length within the range of 0 to 6 mm so that the wall thickness of the box section is thicker than that of the pipe proper to that extent. The inside diameter of the box section gradually increases from the thick walled portion towards the pipe proper with which the box section is integrally joined (to the right side in FIG. 3), forming a substantially tapered internal surface in section, and finally becomes equivalent to the inside diameter of the pipe proper in a smooth way. The restrictive range of variation in the inside diameter of the pin section in FIG. 2 applies in its entirety to variation in the inside diameter of the box section of the integral type threaded connection, and particularly, in reference to "smooth gradual increase".

An expanded view of a mark B in FIG. 3 corresponds to FIG. 2. The restrictive range of the inside diameter of the pin section as described with reference to FIG. 2 is applicable in its entirety to the pin section of the integral type threaded connection shown in FIG. 3. There is no restriction on a range of lengths for which the inside diameter of the box section of the integral type threaded connection is rendered smaller provided that the internal surface thereof is shaped smoothly in the sense mentioned above.

The present invention is more effective in the case of a ratio of the wall thickness of a pipe proper to the outside diameter thereof (hereinafter referred to as "wall thickness ratio") is 0.055 or less. When a pipe proper having the wall thickness ratio of 0.055 or less is subjected to various loads, deformation thereof, as large as in the case of the wall thickness being substantially thin, is caused to occur, accompanied by similarly large deformation at the extremity of the pin section. Consequently, there are cases where a threaded connection provided with threads designed for improved capability of sharing compressive force, as disclosed in, for example, Japanese Patent Laid-Open No. Hei 6-281061 and Hei 6-281059, do not have sufficient compressive force resistance as a whole. In such a case as above, high compressive force resistance is ensured by use of the threaded connection according to the invention.

Common type triangular thread or trapezoidal thread as specified in the specification of API (American Petroleum Institute) may be used for the threaded connection according to the invention. It is more effective to improve compressive stress resistance of the threaded connection for a primary object of the invention, providing a thread section with a capability of bearing part of compressive force. Accordingly, the threads with the shapes as disclosed in, for example, Japanese Patent Laid-Open Nos. Hei 6-281061 or Hei 6-281059, may be useful for the invention.

The thread disclosed in above Japanese Patent Laid-Open No. Hei 6-281059 is specified as follows.

A trapezoidal threaded connection wherein load surfaces of a male thread and a female thread 51, 61 are rendered to contact each other, either of the gap between top surfaces of a male thread and a female thread 54, 64 or the gap between the bottom surfaces of a male thread and a female thread 53, 63 are rendered to contact and the others are rendered to have space, and the gap between the inserting surface of a male thread and female thread 52, 62 are rendered to have space of 0 mm to 0.03 mm when made-up.

The reason of the above shape is to keep enough sealing capability after compressive force is loaded and to ensure durability against repeated use. The reason to make contact either at the top surface 54, 64 or at the bottom surface 53, 63 is to prevent the surface of the threads from mechanical damage. The reasons to have space on either side of the above gap are to let lubricant such as grease penetrate along the gap to ensure the prevention of mechanical damage of the thread surface and to let air which is enclosed in the gap between the pin section and box section release when connection is made-up.

In the case of connection with torque shoulder, the load surfaces of a male thread and female thread 51, 61 must have a contact each other to share the counter force due to the torque shoulder's contact. In addition, at least one of the other 3 surfaces must have contact to stabilize the connection of the both threads. Accordingly, either at the gap between the top surfaces 54, 64, or at the gap between the bottom surfaces 53, 63 is to contact with each other. The reason to keep a space by 0 mm to 0.03 mm at the gap between inserting surfaces 52, 62 by larger than 0 mm and not larger than 0.03 mm is to reduce plastic deformation at the seal section and torque shoulder section when a compressive force is imposed to the connection. The reason to have trapezoidal shape of the thread is to reduce the ratio of the height to the pitch of the thread comparing to triangular shape resulting with aiming higher efficiency of the connection.

The thread shape disclosed in Japanese Patent Laid-Open No. Hei 6-281061 is specified as follows.

A trapezoidal threaded connection wherein a flank angle α at load surface is not less than −20° and less than 0°, flank angle θ at the inserting surface is larger than 30° and not larger than 60°, both the gap between the load surfaces of a male thread and a female thread 51, 61 and the gap between the inserting surface of a male thread and a female thread 52, 62 are rendered to have contact, and both the gap between the top surfaces of a male thread and a female thread 54, 64 and the gap between bottom surfaces of a male thread and a female thread 53, 63 are rendered to have space when made-up.

The reason of the above shape is to avoid disconnection phenomenon (jump-out phenomenon) which is caused by relative distortion between a male and a female thread in radius direction when a excess tensile force is subjected to the connection and to keep enough sealing capability after compressive force is loaded.

The reason to make the flank angle α at the load surface smaller than 0° is to avoid disconnection between a male and a female thread considering the distortion of thread portion when tensile force is loaded. The flank angle α is to be equal or larger than −20°, because earlier damage at the root of thread may occur if α is smaller than −20°. If the flank angle θ of the inserting surface is equal to or less than 30°, the contact pressure thereof exceeds a yield stress of the material and may cause sticking (gouging) at the surface of the thread. On the other hand, if θ is larger than 60°, the seal section and the torque shoulder section are apt to cause plastic deformation, therefore, θ is to be not larger than 60°.

The reason to have contact both at the load surface 51, 61 and at inserting surface 52, 62 is to ensure the compressive capability of the connection when made-up. In addition, the reason to have space both at the top surface 54, 64 and at the bottom surface 53, 63 is to allow grease to penetrate and to allow air to release. The reason of trapezoidal thread shape is comes from the same reason as mentioned above.

The threaded connection according to the invention is manufactured by machining the ends of a pipe proper after applying hot or clod working for reduction of the outside diameter and for increasing the wall thickness. In the case of cold working on a carbon steel or alloy steel, annealing for decreasing or removing strains caused by such working is preferable in a temperature range such that no deformation is caused to occur, from the viewpoint of corrosion resistance. However, in the case of a stainless steel, annealing does not necessarily contribute to improvement in corrosion resistance. Hence, appropriate heat treatment depending on a class of steel may preferably be applied. An amount of reduction in the outside diameter or increase in the wall thickness is relatively small, and consequently, a cost of processing as above does not represent a significant proportion of the total manufacturing cost of the threaded connection.

[Embodiments]

The effect of the invention is shown hereafter with reference to embodiments of the invention.

(Embodiment 1)

Composite Load Test

Figure 8:
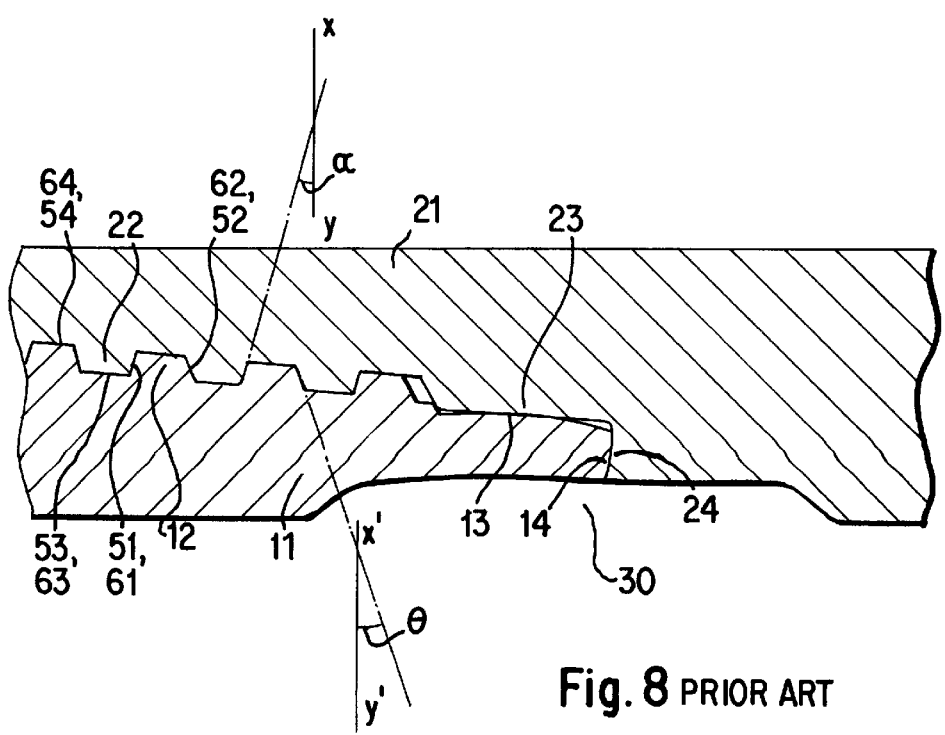

FIG. 4 is a list showing coupling type threaded connections within the scope of the invention as shown in FIG. 1 to FIG. 3 and threaded connections prepared for comparative purposes with the shape identical to the shape shown in FIG. 8. These threaded connections are of use for connecting steel pipes made of 13% Cr steel, with the outside diameter in the range of 88.9 mm to 339.7 mm. FIG. 5 shows a chemical composition and mechanical property of the above 13% Cr steel pipes. The box section thereof was also made of the same class of steel.

Shapes of all the threaded connections used for test specimens were rendered identical except the internal surface of the pin section at its extremity. Specifically, thread shape, length of thread section, length of seal taper, and the like were as described below, and those features are the same among the threaded connections according to the invention and those of the related art.

Thread shape: trapezoidal thread according to API specification.

Length of thread section: 4 times of the wall thickness of the pipe proper.

Thread interference: 0.3 mm.

Thread taper: 1/16.

Shape of the seal section: tapered seal (taper: 1/10, length of the seal section: 10 mm).

The term of "difference between the inside diameters of the pin section at its extremity" in FIG. 4 refers to a difference in the inside diameter between the portion having a constant inside diameter dx1 and the pipe proper in the case of the embodiments of the invention. The same term refers to a difference in the inside diameter between the portion having the grooves at a constant depth and the pipe proper in the case of comparative examples. The length of the thick walled portion or thin walled portion (that is, provided with grooves) with a constant thickness in the axial direction, is rendered equivalent to 21% of the length of the pin section, from the extremity thereof in the case of the embodiments of the invention (thick walled), and is rendered to 16% of the length of the pin section from the extremity thereof, in the case of the comparative examples (thin walled), respectively. Further, a position where the thick walled or thin walled inside diameter reaches to the inside diameter of the pipe proper gradually and smoothly from either the portion of thick walled or the portion of thin walled with constant thickness is located at 30% of the length of the pin section from the extremity thereof in the case of the embodiments of the invention, or at 19% of same in the case of the comparative examples, respectively. These features are common to all the embodiments of the invention and to all the comparative examples, respectively.

The threaded connections described above were subjected to composite load tests under test conditions mentioned below, and the performance thereof was evaluated.

After respective threaded connections were made up, a compressive force in the direction of the axis of the pipe proper was applied to the pipe proper such that a stress equivalent to 50% of yield strength of the pipe proper was caused to occur thereto, and then, after sealing an end of the pipe proper, on the other side of the threaded connection, by welding, an internal pressure was applied to the threaded connection, gradually increasing same until leakage of the internal pressure occurred to the threaded connection. Herein, von Mises's equivalent stress $\sigma eq$ occurring to the pipe proper at an internal pressure load test is expressed by the following formula (2). Accordingly, intensity of the internal pressure is expressed by a ratio of the equivalent stress $\sigma eq$ when leakage occurred, to yield strength of a material $\sigma y$, that is, $\sigma eq/\sigma y$. The internal pressure was applied until said ratio reached a maximum of 100%.

von Mises's equivalent stress:

$$\sigma eq=(\sigma\theta^2+\sigma z^2-\sigma\theta\cdot\sigma z)^{1/2} \quad (2)$$

Where;

Stress in the direction of the circumference of the pipe proper:

$$\sigma\theta=p\times\{(D^2/d0^2)+1\}/\{(D^2/d0^2)-1\},$$

and

Stress in the direction of the axis of the pipe proper:

$$\sigma z=p/\{(D^2/d0^2)-1\},$$

provided that D: the outside diameter of the pipe proper (mm), d0: the inside diameter of the pipe proper (mm), and p: internal pressure applied at the test (unit: is optional).

(Result of Embodiment 1)

Values of a $\sigma eq/\sigma y$ when leakage occurred are shown in the extreme right column in FIG. 4 under heading "leakage load". As shown in FIG. 4, in the case of conventional threaded connections as comparative examples, leakage of the internal pressure occurred at a $\sigma eq/\sigma y$ ratio within the range of 60% to 90% while in the case of the threaded connections according to the invention, leakage of the internal pressure did not occur even at 100% of a $\sigma eq/\sigma y$ ratio, indicating that integrity in the performance of the threaded connection was maintained even when a compressive force equivalent to the yield strength of the pipe proper was applied. A leakage load for each of the threaded connections marked C, D, and E with a wall thickness ratio at 0.055 or less as embodiments of the invention, is higher by 25% or more in comparison with that of the threaded connections marked c, d, and e, as comparative examples with the same wall thickness ratio as that of the corresponding threaded connections according to the invention. As evidenced by comparing performance of the threaded connections A, and B with a wall thickness ratio in excess of 0.055 according to the invention, with the threaded connections, a, and b as comparative examples, the magnitude of improvement in leakage load in the range of 10 to 25%, is smaller than the case of the wall thickness ratio being at 0.055 or less. This shows that the effect of the threaded connection according to the invention is greater in the case of thin walled large diameter oil country tubular goods.

(Embodiment 2)

Corrosion Test on the Internal Surface of the Threaded Connection

Corrosion tests were conducted both on the internal and external surfaces of the threaded connections, indicating that corrosion is well under control in the case of the threaded connection according to the invention as shown below.

The threaded connections marked A, made of 13% Cr steel pipes with 88.9 mm in outside diameter, and 6.4 mm in wall thickness were used as test specimens.

Figure 6A:
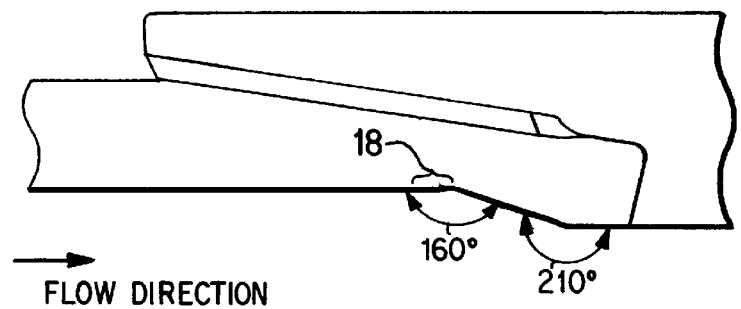
FIG. 6(*a*) is a sectional view of the threaded connections used as specimens at an internal surface corrosion test showing an embodiment of the invention, having a smoothly shaped internal surface.
Figure 6B:
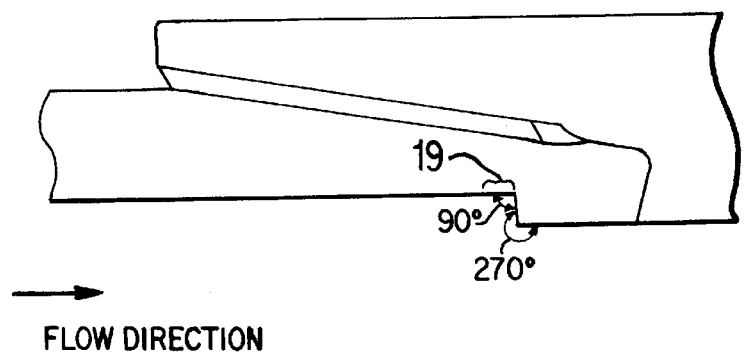

FIG. 6(a) and FIG. 6(b) are sectional views showing a significant part of the threaded connection according to the invention and same of the comparative example, respectively. After circulating a fluid at 150° C. of a 5% NaCl aqueous solution supersaturated with $CO_2$ at 30 atm inside the respective threaded connections in a state of make-up at a flow rate of 7 m/sec for two weeks (336 hours), amounts of loss in wall thickness were measured.

(Result of Embodiment)

In the case of the threaded connection according to the invention, the maximum amount of loss in wall thickness was found to be 0.02 mm at the measured point 18, representing a normally acceptable limit of loss in wall thickness, while in the case of the comparative example, the maximum amount of loss in wall thickness at a measured point 19 was 0.2 mm. This represents a ten times difference in the amount of loss in wall thickness between the aforesaid specimens, evidencing an effect of the internal shape of the threaded connection according to the invention.

(Embodiment 3)

Stress Corrosion Cracking Test on the External Surface of the Box Section

The threaded connection marked A shown in FIG. 4, (13% Cr steel pipes, with 88.9 mm in outside diameter, and 6.4 mm in wall thickness), which was the same as the specimen used in Embodiment 2 above, was used for test specimens.

Figure 7A:
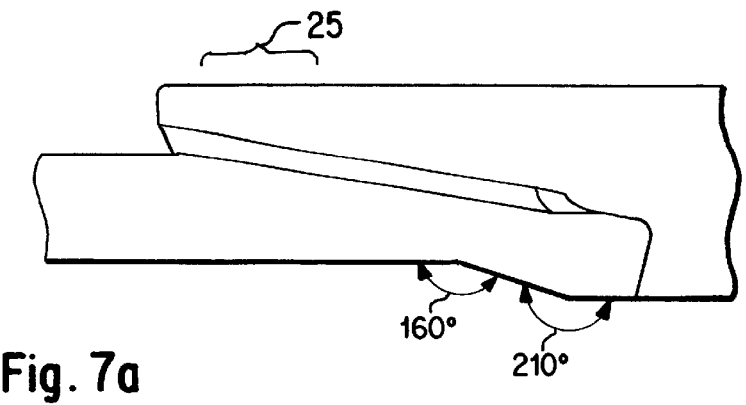
FIG. 7(*a*) is a sectional view of the threaded connections used as a specimen at the test on stress corrosion cracking on the box section showing an embodiment of the invention wherein the thick walled portion of the pin section extends up to 17% of the length of the pin section from the extremity thereof FIG. 7(*b*) is a sectional view of the threaded connections used as a specimen at the test on stress corrosion cracking on the box section showing a comparative example wherein the thick walled portion of the pin section extends up to 93% of the length mentioned above. Numerals 25 and 26 are measured regions of the box section for stress corrosion cracking.
Figure 7B:
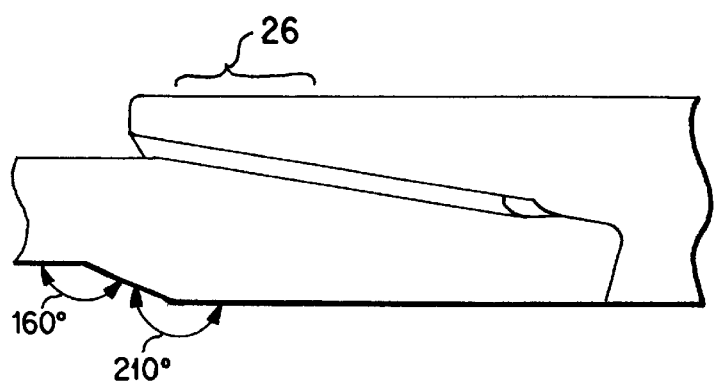

FIG. 7(a) is a sectional view of the threaded connection according to the invention, wherein a length of the thick walled portion of the pin section is rendered not larger than a half of the length of the pin section from the extremity thereof FIG. 7(b) is a sectional view of the threaded connection for comparative example, wherein the thick walled portion extends close to the root of the pin section. In FIG. 7(a), the thick walled portion of a constant thickness extends up to 17% of the length of the pin section from the extremity thereof, and in FIG. 7(b), the same extends up to about 93% of the length of the pin section.

After immersing the threaded connections described above in a state of make-up in a 5% NaCl aqueous solution at 25° C., bubbled by $CO_2$ gas contaning 1% $H_2S$ for two weeks (336 hours), the external surface of the box section of the respective specimens was examined.

(Result of Embodiment 3)

In the case of the comparative example, stress corrosion cracking was found in a region 26 on the external surface of the box section while no cracking was observed in a corresponding region 25 in the case of the embodiment of the invention. This result came from a fact that in the case of the comparative example, the inside diameter of the pin section being reduced up to the root thereof, the rigidity of the pin section in regions affected thereby became excessively high, and caused an increase in stress occurring due to interference of the thread sections, and acting on the external surface of the box section.

There is a method of avoiding this problem by enlarging the box section to increase the wall thickness, but such a method requires a larger diameter of an oil well to enable enlarged threaded connections to be inserted into the oil well, and it may create another problem of an increase in drilling costs correspondingly.

In Embodiments 1 to 3 described above, the coupling type threaded connection of the constitution as shown in FIG. 1 is described. It is apparent, however, that similar effects are obtainable with the integral type threaded connection shown in FIG. 3 from fact that part B in FIG. 3 being identical with the corresponding part in FIG. 2.

[Industrial Applicability]

The threaded connection for oil country tubular goods, according to the invention, is highly beneficial to the industry for extracting natural gas and crude oil because it has excellent gas tightness even after compressive force or bending load is applied thereto, it does not need delicate handling which reduce operational efficiency and has sufficient durability even when used in oil wells being worked at ever-increasing depths, and under increasingly corrosive environments.

What is claimed is:

1. A threaded connection for oil country tubular goods, wherein a metal-to-metal contact seal is formed when a seal forming threadless face on an external surface of a pin section, which is closer to an extremity of the pin section than a male thread section on a tapered external surface of the pin section, is brought into contact with a seal forming threadless face on an internal surface of a box section which has a female thread section having a smaller thread pitch diameter than that of the male thread section, and a torque shoulder is formed when a torque shoulder forming threadless face at the extremity of the pin section, is butted against a torque shoulder forming threadless face in an innermost region of the box section, and characterized in that an axial length of a thick walled portion, formed by reducing the inside diameter thereof such that a condition expressed by a Formula (1) given below is satisfied, $$d0 > dx \geq d0 - 6 \qquad \text{Formula (1)}$$

wherein $dx$(mm)=inside diameter of the thick walled portion, $d0$(mm)=inside diameter of the pipe proper, is greater than an axial length extending from the extremity of the pin section to a metal-to-metal contact seal forming section, and equivalent to or less than one half of an entire pin section length, and characterized in that an internal surface of the thick walled portion consists of a portion having a constant inside diameter of $dx1$ and a portion having a varying inside diameter of $dx2$, where $dx2$ gradually increases from $dx1$ up to $d0$, while an inside diameter of the box section at the torque shoulder is equal to that of the extremity of the pin section in a state of the thread connection being made up.

2. A threaded connection for oil country tubular goods, wherein a ratio of the wall thickness of a pipe proper to the outside diameter thereof is 0.055 or less, and a metal-to-metal contact seal is formed when a seal forming threadless face on an external surface of a pin section, which is closer to an extremity of the pin section than a male thread section on a tapered external surface of the pin section, is brought into contact with a seal forming threadless face on an internal surface of a box section which has a female thread section having a smaller thread pitch diameter than that of the male thread section, and a torque shoulder is formed when a torque shoulder forming threadless face at the extremity of the pin section, is butted against a torque shoulder forming threadless face in an innermost region of the box section, and characterized in that an axial length of a thick walled portion, formed by reducing the inside diameter thereof such that a condition expressed by a Formula (1) given below is satisfied, $$d0 > dx \geq d0 - 6 \qquad \text{Formula (1)}$$

wherein $dx$(mm)=inside diameter of the thick walled portion, $d0$(mm)=inside diameter of the pipe proper, is greater than an axial length extending from the extremity of the pin section to a metal-to-metal contact seal forming section, and equivalent to or less than one half of an entire pin section length, and characterized in that an internal surface of the thick walled portion consists of a portion having a constant inside diameter of $dx1$ and a portion having a varying inside diameter of $dx2$, where $dx2$ gradually increases from $dx1$ up to $d0$, while an inside diameter of the box section at the torque shoulder is equal to that of the extremity of the pin section in a state of the thread connection being made up.

3. A threaded connection for oil country tubular goods, as defined in claim 1, wherein the shape of the thread is buttress, load flanks of a male thread and a female thread, have contact with each other, either top surfaces of a male thread and a female thread or bottom surfaces of a male thread and a female thread have contact with each other, and the other of these two pairs of surfaces has a gap, and stabbing flanks of a male thread and a female thread have a gap of larger than 0 mm and equal to or less than 0.03 mm in a state of the threaded connection being made up.

4. A threaded connection for oil country tubular goods, as defined in claim 2, wherein the shape of the thread is buttress, load flanks of a male thread and a female thread, have contact with each other, either top surfaces of a male thread and a female thread or bottom surfaces of a male thread and a female thread have contact with each other, and the other of these two pairs of surfaces has a gap, and stabbing flanks of a male thread and a female thread have a gap of larger than 0 mm and equal to or less than 0.03 mm in a state of the threaded connection being made up.

5. A threaded connection for oil country tubular goods, as defined in claim 1, wherein the shape of the thread is buttress, the flank angle $\alpha$ of a load flank of the thread is equal to or larger than $-20°$ and less than $0°$, the flank angle $\theta$ of a stabbing flank is larger than $30°$ and equal to or less than $60°$, and in a state of the threaded connection being made up, both load flanks of a male thread and a female thread and stabbing flanks of a male thread and a female thread have contact with each other, and both top surfaces of a male thread and a female thread and bottom surfaces of a male thread and a female thread have gaps, respectively.

6. A threaded connection for oil country tubular goods, as defined in claim 2, wherein the shape of the thread is buttress, the flank angle $\alpha$ of a load flank of the thread is equal to or larger than $-20°$ and less than $0°$, the flank angle $\theta$ of a stabbing flank is larger than $30°$ and equal to or less than $60°$, and in a state of the threaded connection being made up, both load flanks of a male thread and a female thread and stabbing flanks of a male thread and a female thread have contact with each other, and both top surfaces of a male thread and a female thread and bottom surfaces of a male thread and a female thread have gaps, respectively.

7. A method of manufacturing a threaded connection for oil country tubular goods, as defined in claim 1, wherein a carbon steel or stainless steel pipe is manufactured by machining the ends thereof after applying hot or cold working for reduction of the outside diameter and for increasing of the wall thickness with or without post working heat treatment.

8. A method of manufacturing a threaded connection for oil country tubular goods, as defined in claim 2, wherein a carbon steel or stainless steel pipe is manufactured by machining the ends thereof after applying hot or cold working for reduction of the outside diameter and for increasing of the wall thickness with or without post working heat treatment.

* * * * *